United States Patent
Jenkins

(10) Patent No.: US 9,572,333 B1
(45) Date of Patent: Feb. 21, 2017

(54) TRIGGER HAPPY COMFORT GRIP

(71) Applicant: Loren Pernell Jenkins, Elk Groove, CA (US)

(72) Inventor: Loren Pernell Jenkins, Elk Groove, CA (US)

( * ) Notice: Subject to any disclaimer, the term of this patent is extended or adjusted under 35 U.S.C. 154(b) by 45 days.

(21) Appl. No.: 14/587,971

(22) Filed: Dec. 31, 2014

Related U.S. Application Data

(63) Continuation-in-part of application No. 14/200,025, filed on Mar. 7, 2014, now abandoned.

(51) Int. Cl.
*A01K 87/08* (2006.01)
*A01K 97/00* (2006.01)

(52) U.S. Cl.
CPC ............... *A01K 87/08* (2013.01); *A01K 97/00* (2013.01)

(58) Field of Classification Search
CPC ................................ A01K 87/06; A01K 87/08
USPC ........ 43/22, 23, 25; 473/551; 16/108, 110.1, 16/421, 422, 426, 427, 429, 430; 223/101; 294/25; 2/21; 7/121; 30/298; 81/177.3; D3/103; D4/29
See application file for complete search history.

(56) References Cited

U.S. PATENT DOCUMENTS

| | | | | |
|---|---|---|---|---|
| 450,447 A | * | 4/1891 | Buchwalter | A41D 13/087 2/21 |
| 2,252,054 A | * | 8/1941 | Welch | A01K 87/08 16/110.1 |
| 3,425,150 A | * | 2/1969 | Braese | A01K 87/00 43/25.2 |
| 3,817,521 A | * | 6/1974 | Wright | A63B 49/08 473/551 |
| 3,839,811 A | * | 10/1974 | Hopkins | A01K 87/00 43/25.2 |
| 4,167,283 A | * | 9/1979 | Feldman | A61F 9/0061 294/1.2 |
| 4,648,196 A | | 3/1987 | Moody | |
| 4,830,306 A | | 5/1989 | Tsunoda et al. | |
| 5,564,215 A | * | 10/1996 | Phelps | A01K 87/00 43/22 |
| 5,797,554 A | | 8/1998 | Atherton et al. | |
| 5,933,863 A | * | 8/1999 | Monsue | A41D 13/087 2/159 |
| 6,273,626 B1 | | 8/2001 | Yazawa | |
| 7,494,081 B2 | | 2/2009 | Savakis et al. | |
| 7,896,762 B2 | * | 3/2011 | Schroeder | A63B 69/38 473/464 |
| 8,602,925 B1 | * | 12/2013 | Rickon, Jr. | A63B 60/12 473/203 |
| 2010/0056309 A1 | * | 3/2010 | Aida | A63B 49/08 473/551 |
| 2012/0102814 A1 | * | 5/2012 | Christensen | A01K 97/06 43/25.2 |

FOREIGN PATENT DOCUMENTS

CA  2073267 A1 * 1/1994  ............. A01K 87/06

* cited by examiner

*Primary Examiner* — Danielle Clerkley
(74) *Attorney, Agent, or Firm* — Ernesto Garcia

(57) ABSTRACT

A resiliently flexible grip for fishing rods has a hollow tubular main body and includes a retaining band that wraps around the fishing rod, which keeps the flexible grip fixed to a trigger of a fishing rod. The main body conforms to any shape of the trigger and compresses uniformly to provide a custom fit on the trigger. The grip, during use, compresses and conforms to the individual user's finger and hands providing comfort while fishing.

7 Claims, 4 Drawing Sheets

TRIGGER HAPPY COMFORT GRIP

FIELD OF THE INVENTION

This invention relates to ergonomic improvements that afford the user a comfortable, non-impeding grip mechanism to relieve pain and discomfort and reduce slippage that can be experienced from the hand and fingers applying constant pressure on the hard plastic triggers.

BACKGROUND OF THE INVENTION

Casting type fishing rods are fashioned with a hard plastic trigger that helps the user grip the rod and provide leverage during all related fishing/angling activities which include casting, retrieving and fighting fish. During all of these activities an amount of force is required to maintain the grip on the fishing rod. The hands and fingers work in unison to provide these activities whereby an amount of strain is place upon the hands and fingers due to the hard plastic material of the trigger contacting the flesh and skin of the user.

In order to provide comfort for the hands and fingers, particularly in between the fingers where the hard plastic triggers actually contact the skin, the soft ergonomic grip is employed. This grip provides a soft pleasurable feeling for the user which allows the user to complete all of the functions and activities of angling, less the pain that can be associated to grasping the hard plastic trigger.

In addition, the grip also provides a mechanism to improve the grasp and reduce slippage by providing a tacky surface to the trigger.

SUMMARY OF THE INVENTION

The grip for a casting type fishing rod trigger of this invention has a resilient soft rubber receptacle. The inner wall of the grip is smaller in comparison to the outer wall, but mirrors it's general shape although the external features and surface texture can vary. The soft, resilient quality of the grip allows the grip to "receive" and conform to the trigger of the casting rod.

It is an object of the present invention to provide comfort to the user who is grasping the trigger.

It is an object of the present invention to provide a grip that reduces hand/finger slippage during angling.

It is an object of the present invention to provide a trigger grip that can accommodate a variety of trigger shapes and sizes.

It is a further object of the present invention to reduce pain in the hands and fingers by providing a soft cushion over the hard plastic trigger of the casting rod.

In another embodiment of the trigger grip, the trigger grip includes a retaining band so that the grip does not slide off the trigger. This distinct embodiment of the grip prevents the use of glue or adhesive and makes the grip secured on the trigger by mere use of the retaining band that surrounds the fishing rod. The trigger grip in the second embodiments includes a series of annular flexible ribs to provide a soft grip to the user.

DESCRIPTION OF THE PREFERRED EMBODIMENT

Figure 1:
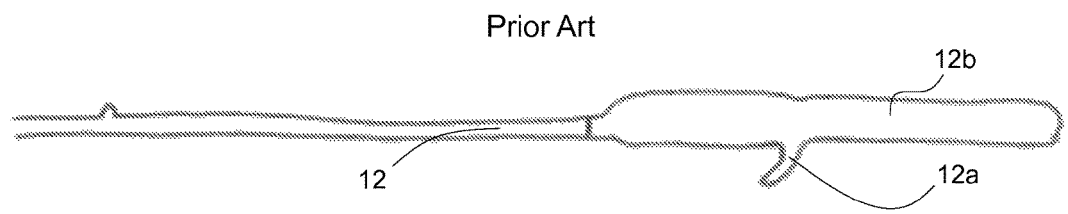
FIG. 1 shows a front view of a conventional prior art cast type fishing rod.
Figure 2:
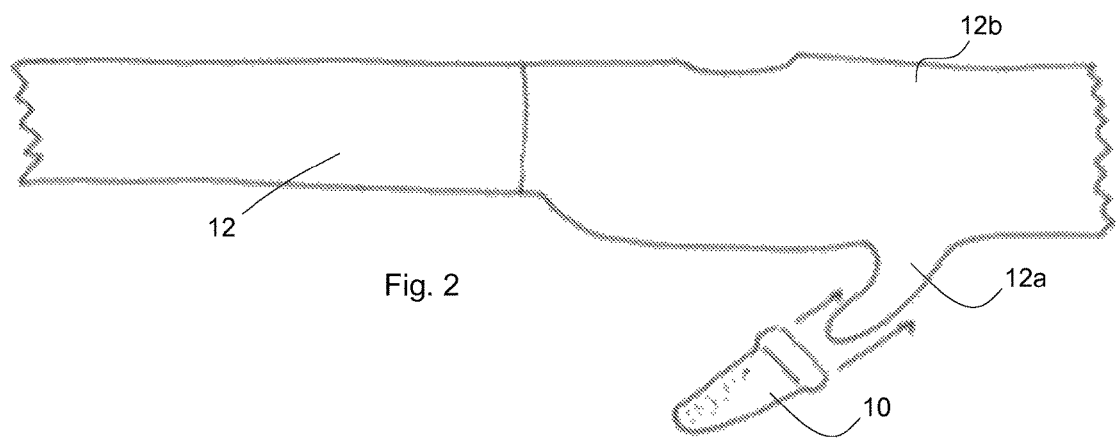
FIG. 2 shows a front view of the trigger grip to be inserted onto the trigger of the fishing rod.
Figure 3:
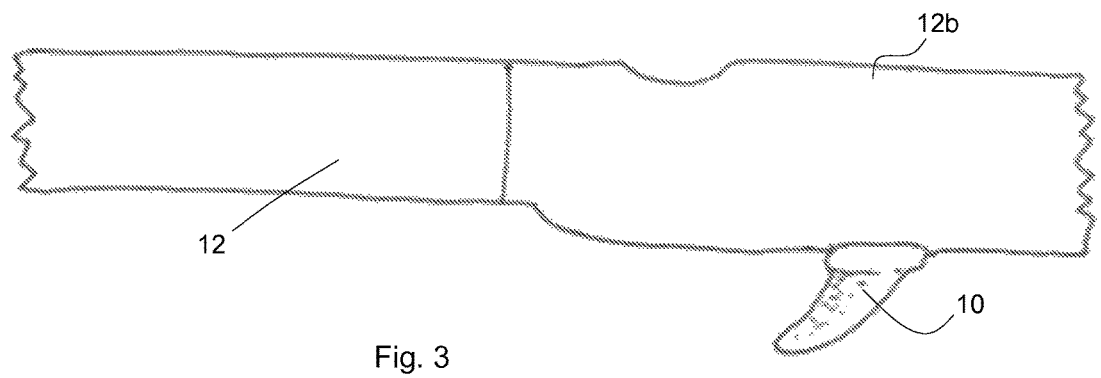
FIG. 3 shows a front view of the trigger grip installed and firmly in place.
Figure 4:
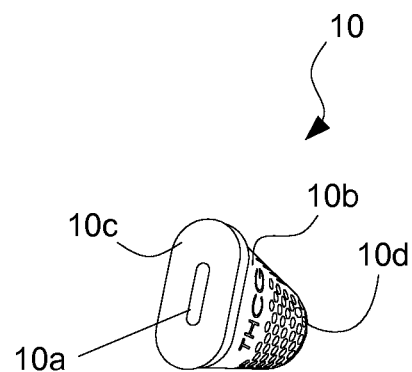
FIG. 4 shows an isometric view of the trigger grip.

Referring more particularly to the drawings, wherein like numbers refer to similar parts. FIGS. 2-4 show a Trigger Happy Comfort Grip 10 for casting rods 12. The Trigger Happy Comfort Grip is formed of a moldable, resilient rubber material yet can vary in their basic shape and construction.

As shown in FIG. 4, the body 10b of the grip 10 can have a variety of shape and construction, but will typically be between 1⅛" and 1¼" in length.

As shown in FIG. 4, the grip 10 includes a tubular-shaped main inner wall 10a and a consistently shaped exterior wall 10b. The main inner wall 10a includes an opening of the grip 10. The grip 10 further includes a flange 10c and the exterior wall 10b includes external surfaces 10d. The external surfaces 10d can have a variety of possible external surfaces.

Figure 5:
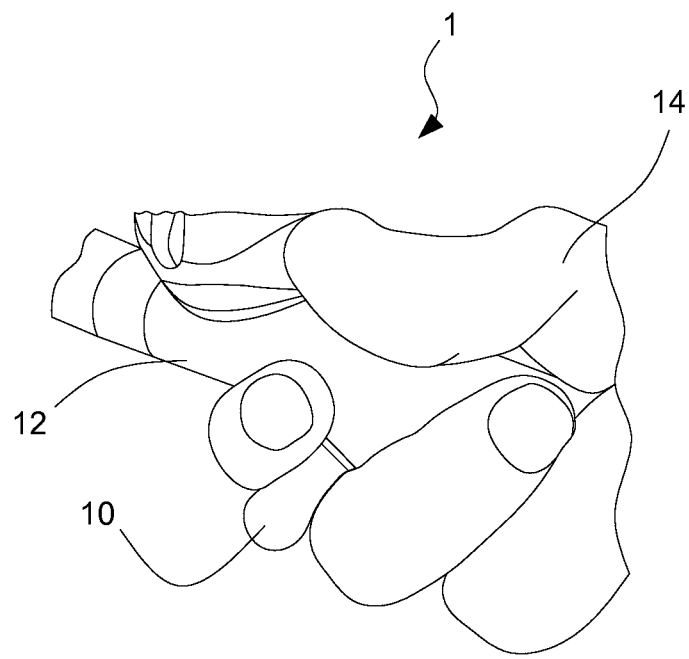
FIG. 5 shows a front view of the trigger grip in use and installed on the trigger.

An effective grip of the flexible material will tend to apply a compressive force to the grip 10, serving to keep the grip in place when grasped between the angler's fingers as shown in FIG. 5.

The Trigger Happy Comfort Grip 10 has resilient cushioning effects and conform to the size, shape an any features or effects such as jewelry, etc. that may be on the fingers and provides a spongy sensation and comfort without the loss of sensitivity of the rod.

As seen in FIG. 3, the removable grip 10 extends about an exterior periphery of the trigger 12a. The opening of the grip receives and conforms to the shape of the trigger 12a. The main inner wall 10a elastically grips the trigger 12a to secure the grip 10 to the trigger 12a. The grip 10 employs a suction effect on the trigger 12a. The flexible material of the grip 10 itself resiliently deforms when a user grasps the trigger between their fingers.

Figure 6:
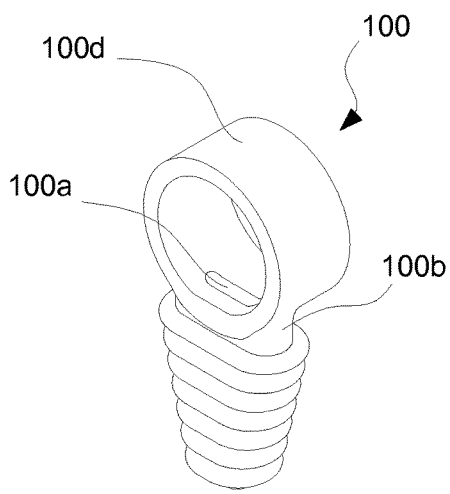
FIG. 6 shows an isometric view of a trigger grip in accordance to a second embodiment of the invention.
Figure 9:
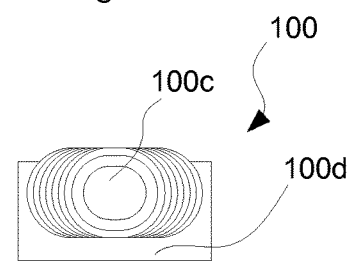
FIG. 9 shows a bottom view of the trigger grip shown in FIG. 6.
Figure 10:
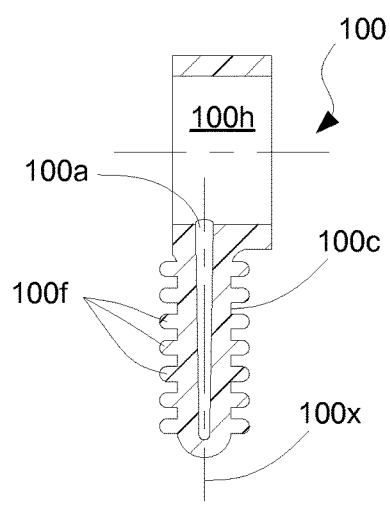
FIG. 10 shows a cross-sectional view 10-10 taken from FIG. 7.
Figure 11:
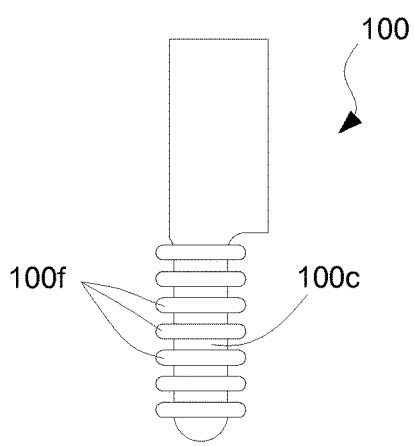
FIG. 11 shows a side view of the trigger grip shown in FIG. 6.
Figure 12:
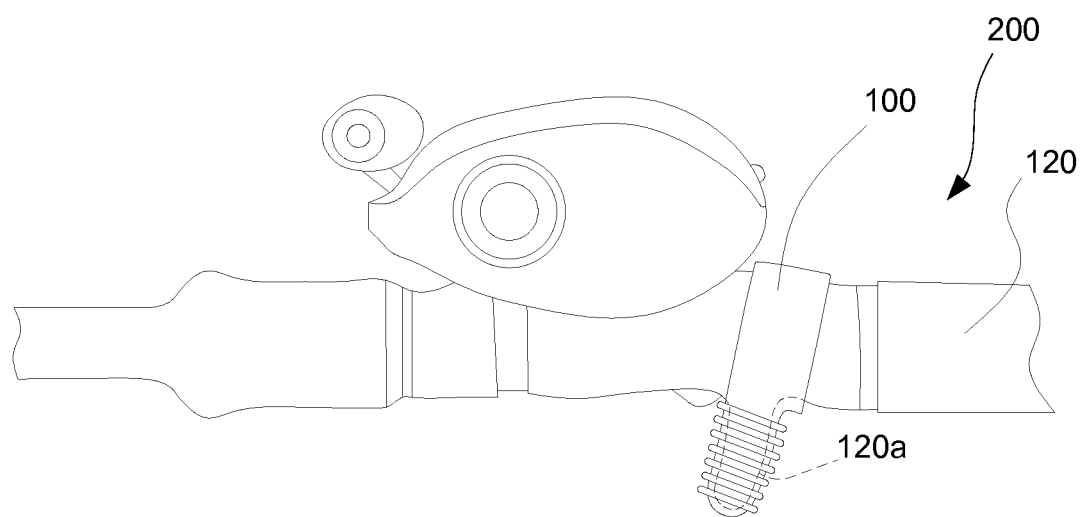
FIG. 12 shows a front view of a fishing rod utilizing the trigger grip shown in FIG. 6 installed on the fishing rod.

As shown in FIG. 6, the invention envisions a second embodiment of a grip 100 utilizing a retaining band 100d that extends from a bridge 100b and which connects to a main body 100c that extends radially and perpendicular to the retaining band 100d. The main body 100c includes a concentric opening 100a wherein a trigger 120a sits in as shown in FIG. 12. The main body 100c includes a series of concentric ribs 100f spaced apart to soften the user's grip while using the fishing rod 120. It is envisioned that the main body 100c is tapered from two opposite sides from the wide transverse direction, while the other two opposite sides, from the narrow transverse direction, are parallel. As shown in FIG. 10, the band 100d includes a substantially circular opening 100h extending perpendicular to a longitudinal axis 100x of the main body 100c. The longitudinal axis 100x of the main body 100c, shown in FIGS. 9-11, places the main body 100c offset relative to a center of the width or depth of the retaining band 100d or the band's centroid. This allows the retaining band 100d to be placed on the fishing rod exposing the fishing rod the most thus giving anglers access to grab the fishing rod at the forward location while most of the retaining band 100d is located in a rear location as shown in FIG. 12.

Figure 7:
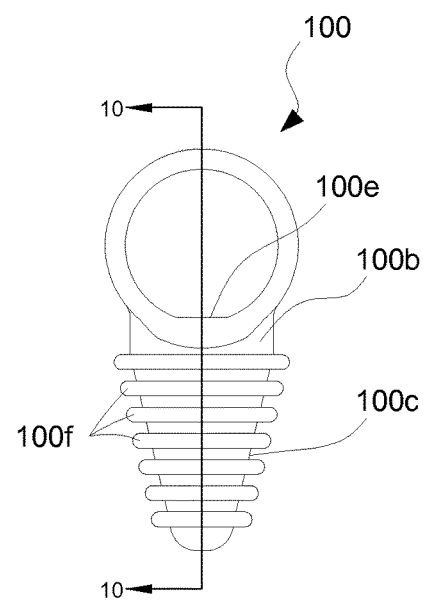
FIG. 7 shows a front view of the trigger grip shown in FIG. 6.
Figure 8:
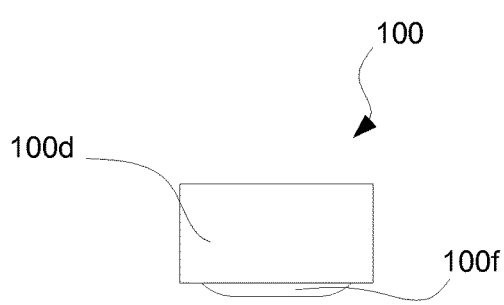
FIG. 8 shows a top view of the trigger grip shown in FIG. 6.

As seen in FIG. 7, the circular opening 100h has a flat portion 100e that provides an attachment point of the band 100d so that the opening 100h provides more surface area to the attachment point. The bridge 100b is axially concentric to the main body 100c and the bridge 100b is homogenously continuous with the main body 100c. Similar to the first embodiment, the grip 100 of the second embodiment slides into the trigger 120a in the same fashion; however, one will slide the band 100d over the fishing rod first so that the grip will not slide off.

It is understood that the invention is not confined to the particular construction and arrangement of parts herein illustrated and described, but embraces all such modified forms thereof as come within the scope as claimed. In particular, the external surfaces of the grip shown in FIG. 4 can be placed on the second embodiment and vice versa. Furthermore, other types of gripping exterior surfaces are envisioned such as exterior surface textures including knurls, ribs, waves, etc.

The invention claimed is:

1. A fishing rod in combination with a flexible grip, the fishing rod including a trigger projecting from the fishing rod;
   wherein the grip includes a concentric opening in a main body of the grip;
   wherein the grip covers an exterior periphery of the trigger;
   wherein the grip further includes a retaining band extending from the main body; and,
   wherein the main body of the grip extends perpendicular and radially from the retaining band.

2. The combination as claimed in claim 1, wherein the main body of the grip is resiliently deformable to conform to the trigger and to elastically grip the trigger securing the grip to the trigger.

3. The combination as claimed in claim 1, wherein the retaining band surrounds the fishing rod.

4. The combination as claimed in claim 3, wherein the grip further includes a bridge between the retaining band and the main body.

5. The combination as claimed in claim 3, wherein the retaining band includes an opening with a substantially circular perimeter and a flat portion to provide more contact surface area.

6. A fishing rod in combination with a flexible grip, the fishing rod including a trigger projecting from the fishing rod;
   wherein the grip includes a concentric opening in a main body of the grip;
   wherein the grip covers an exterior periphery of the trigger;
   wherein the grip further includes a retaining band extending from the main body; and,
   wherein the longitudinal axis of the main body of the grip is offset relative to a center of the width of the retaining band orienting the main body forward of the fishing rod.

7. A fishing rod in combination with a flexible grip, the fishing rod including a trigger projecting from the fishing rod;
   wherein the grip includes a concentric opening in a main body of the grip;
   wherein the grip covers an exterior periphery of the trigger;
   wherein the grip further includes a retaining band extending from the main body; and,
   wherein the main body of the grip further includes at least one rib or axially spaced ribs extending outwardly from the main body to allow a user to grasp the trigger between two fingers while the grip conforms to the fingers.

\* \* \* \* \*